(12) United States Patent
Petersen et al.

(10) Patent No.: US 12,487,868 B1
(45) Date of Patent: Dec. 2, 2025

(54) DATA MANAGEMENT USING RAPID PROGRAM LAUNCH

(71) Applicant: Ethernovia Inc., San Jose, CA (US)

(72) Inventors: Brian Arnold Petersen, San Francisco, CA (US); Joseph Andonieh, Aurora (CA); Atul Prakash Agarwal, Kolkata (IN)

(73) Assignee: Ethernovia Inc., San Jose, CA (US)

( * ) Notice: Subject to any disclaimer, the term of this patent is extended or adjusted under 35 U.S.C. 154(b) by 520 days.

(21) Appl. No.: 18/149,470

(22) Filed: Jan. 3, 2023

Related U.S. Application Data

(60) Provisional application No. 63/266,341, filed on Jan. 3, 2022.

(51) Int. Cl.
*G06F 9/54* (2006.01)
*G06F 9/445* (2018.01)
*G06F 13/20* (2006.01)

(52) U.S. Cl.
CPC .......... *G06F 9/542* (2013.01); *G06F 9/44521* (2013.01); *G06F 13/20* (2013.01); *G06F 2213/40* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | | |
|---|---|---|---|---|
| 8,209,492 | B2* | 6/2012 | Howlett | G06F 9/52 711/149 |
| 10,140,448 | B2* | 11/2018 | Lukacs | G06F 21/52 |
| 12,020,066 | B2* | 6/2024 | Auernhammer | G06F 30/333 |

* cited by examiner

*Primary Examiner* — Andy Ho
(74) *Attorney, Agent, or Firm* — Schwegman, Lundberg & Woessner, P.A.

(57) ABSTRACT

Various embodiments described herein support or provide for rapid program launch, such as receiving a notification from a hardware unit; causing the hardware unit to load one or more working registers associated with the processor with the one or more parameters; launching the program that handles the notification based on the one or more parameters; generating one or more result values based on a launching of the program; and exporting the one or more result values to the hardware unit for processing.

20 Claims, 8 Drawing Sheets

DATA MANAGEMENT USING RAPID PROGRAM LAUNCH

PRIORITY APPLICATION

This application claims priority to U.S. Provisional Patent Application Ser. No. 63/266,341, filed on Jan. 3, 2022, the disclosure of which is incorporated by reference herein in its entirety.

TECHNICAL FIELD

The present disclosure generally relates to data management and, more particularly, various embodiments described herein provide for systems, methods, techniques, instruction sequences, and devices that facilitate rapid program launch.

BACKGROUND

Data management systems face challenges when it comes to optimizing the performance of microprocessors. Specifically, certain routine operations, such as launching programs, loading input data, and exporting output data, can quickly dominate the execution time of a microprocessor, negatively affecting the microprocessor's performance. Improvements are needed.

BRIEF DESCRIPTION OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some embodiments are illustrated by way of embodiments, and not limitations, in the accompanying figures.

DETAILED DESCRIPTION

Figure 1:
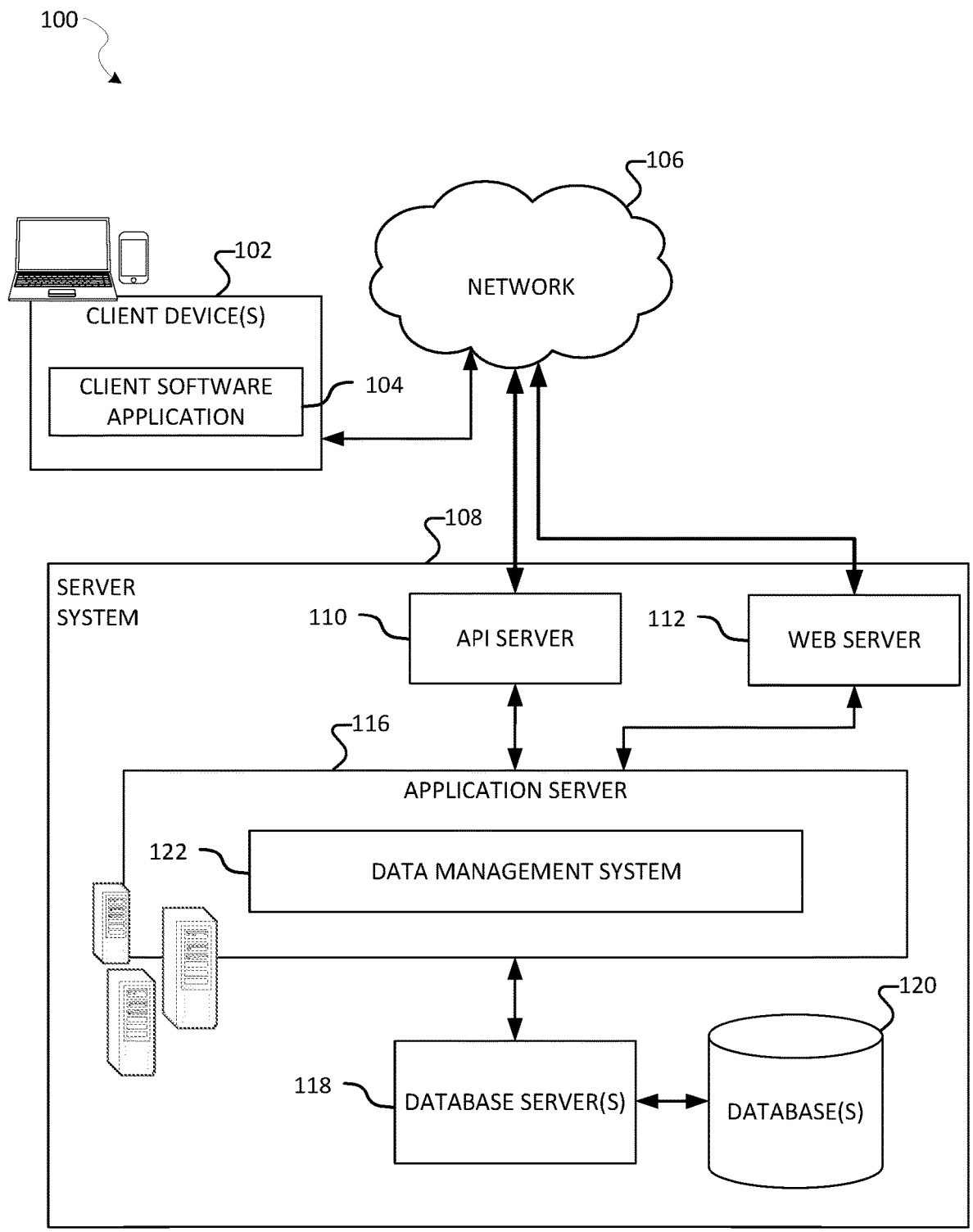
FIG. 1 is a block diagram showing an example data system that includes a data management system, according to various embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter can be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described can be practiced without the specific details presented herein, or in various combinations, as described herein. Furthermore, well-known features can be omitted or simplified in order not to obscure the described embodiments. Various embodiments may be given throughout this description. These are merely descriptions of specific embodiments. The scope or meaning of the claims is not limited to the embodiments given.

Various embodiments include systems, methods, and non-transitory computer-readable media that facilitate rapid program launch. Specifically, a data management, including one or more multi-threaded processors, can be used to manage connection state and orchestrate activities of a range of hardware functions. For example, programs can be launched by a multi-threaded processor (also referred to as a processor or a microprocessor) in reaction to certain hardware activities (e.g., the reception of data packets). After launching and running one or more programs, the multi-threaded processor can perform one or more Input-Output (I/O) write operations to one or more hardware units based on the results (or result values), thereby passing the control to the one or more hardware units. This way, the relationship between hardware units can be moderated by one or more hardware processors.

A multi-threaded processor can provide a simple processing pipeline that performs productive work on every clock cycle. Each thread can be considered as a separate processor core that operates independently from the rest of the threads.

A program run by a processor can export results (or result values) with one or more I/O write operations. An I/O write operation can launch one or more hardware processes that can require a considerable amount of time (e.g., thousands of clock cycles) to complete. Thus, once hardware (also referred to as hardware unit) is triggered, it can remain busy and unable to accept further work with the same thread for a considerable amount of time. This means that a processor cannot execute I/O write operations addressed to the busy (or unavailable) hardware.

It would be inefficient for a program to sit idle while it polls the hardware status before performing one or more I/O write operations. It is beneficial for the program not to launch until the hardware becomes available (e.g., able to accept I/O write operations). In various embodiments, a data management system can include one or more processors (e.g., multi-threaded processors). Upon receiving one or more notifications from a hardware unit, the data management system determines whether the hardware is available. The data management system launches (or causes a processor to launch) a program to handle the one or more notifications upon determining that the hardware is available.

In various embodiments, a data management system receives (or causes a processor to receive) one or more notifications from a hardware unit. A notification can include one or more parameters that trigger a program that processes the notification. The data management system causes the hardware to load one or more working registers associated with the processor with the one or more parameters in a single parallel operation. The data management system launches (or causes a processor to launch) one or more programs that handle the one or more notifications based on the one or more parameters.

In various embodiments, the data management system generates (or causes the processor to generate) one or more result values based on the launching of the one or more programs. The data management system exports (or causes the processor to export) the one or more result values to the hardware for processing.

In various embodiments, a processor, or a component (e.g., thread manager) thereof, monitors the hardware associated with the registered I/O write functions and only allows a notification to arbitrate for access to a thread when all of the registered I/O write functions are able to accept an I/O write operation. Each hardware element triggered by an I/O write operation can maintain a staging register (e.g., a single-entry FIFO) to hold I/O write parameters temporarily until the hardware is ready to accept those parameters. If the hardware is idle when an I/O write operation is performed to it, the parameters can pass through that staging register in a few clock cycles. If the hardware is busy (or unavailable) executing the work implied by an earlier I/O write operation, the parameters of the current I/O write operations are held in the staging register until the hardware completes its current operation. There can be one such staging register per thread for each I/O write operation. The staging register may also be a multi-entry FIFO. In various embodiments, after a processor uses a thread to execute an Exit instruction, the thread becomes immediately available to launch a new program.

In various embodiments, the data management system receives (or causes a processor to receive) a message from the hardware. The data management system determines whether that message includes an indication that the hardware is available to respond to one or more operations. Upon determining that the hardware is available, the data management system launches (or causes a processor to launch) one or more programs that handle the one or more notifications based on the one or more parameters.

In various embodiments, upon determining that the hardware is unavailable to respond to one or more operations, the data management system withholds (or causes the processor to withhold) the launching of the one or more programs until receiving an indication that the hardware is available to respond to the one or more operations.

In various embodiments, a hardware unit can be associated with one or more staging registers. The data management system can identify the status of the one or more staging registers and determine whether the hardware is available based on the status of the one or more staging registers. In various embodiments, a staging register can include a single-entry first-in-first-out (FIFO) component and/or a multi-entry FIFO component.

In various embodiments, the data management system stores (or causes a processor to store) one or more result values in the one or more staging registers associated with hardware. In various embodiments, the data management system identifies one or more I/O write parameters associated with the one or more result values. The data management system stores the one or more I/O write parameters in a FIFO component (e.g., single entry FIFO) associated with the hardware. The data management system causes the hardware to process the one or more result values based on the one or more I/O write parameters.

In various embodiments, one or more I/O write operations can cause hardware to launch one or more hardware activities.

In various embodiments, the data management system receives (or causes a multi-threaded processor to receive) a plurality of notifications from a plurality of hardware. The data management system uses (or causes the multi-threaded processor to use) each thread to launch a specific program that handles each notification. Each thread of the multi-threaded processor can correspond to a processor core that operates independently from other threads. The data management system generates (or causes the multi-threaded processor to generate) result values based on the launching of the programs. The data management system uses the threads to export (or causes the multi-threaded processor to use its threads to export) the result values in parallel to the plurality of hardware. Under this approach, a multi-threaded processor can provide a simple processing pipeline that performs productive work on every clock cycle, significantly improving the processor's performance.

Reference will now be made in detail to embodiments, embodiments of which are illustrated in the appended drawings. The present disclosure may, however, be embodied in many different forms and should not be construed as being limited to the embodiments set forth herein.

FIG. 1 is a block diagram showing an example data system 100 that includes a data management system (hereafter, the data management system 122, or system 122), according to various embodiments. As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the data management system 122 on the server system 108, it will be appreciated that the location of certain functionality within the server system 108 is a design choice. It can be technically preferable to initially deploy certain technology and functionality within the server system 108, but to later migrate this technology and functionality to the client software application 104 where the client device 102 provides various operations as described herein.

The server system 108 supports various services and operations that are provided to the client software application 104 by the data management system 122. Such operations include transmitting data from the data management system 122 to the client software application 104, receiving data from the client software application 104 to the system 122, and system 122 processing data generated by the client software application 104. Data exchanges within the data system 100 can be invoked and controlled through operations of software component environments available via one or more endpoints, or functions available via one or more user interfaces of the client software application 104, which can include web-based user interfaces provided by the server system 108 for presentation at the client device 102.

With respect to the server system 108, each of an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that can be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the data management system 122 of the application server 116.

The application server 116 hosts a number of applications and subsystems, including the data management system 122, which supports various functions and services with respect to various embodiments described herein.

The application server 116 is communicatively coupled to a database server 118, which facilitates access to database 120, which stores data associated with the data management system 122.

Figure 2:
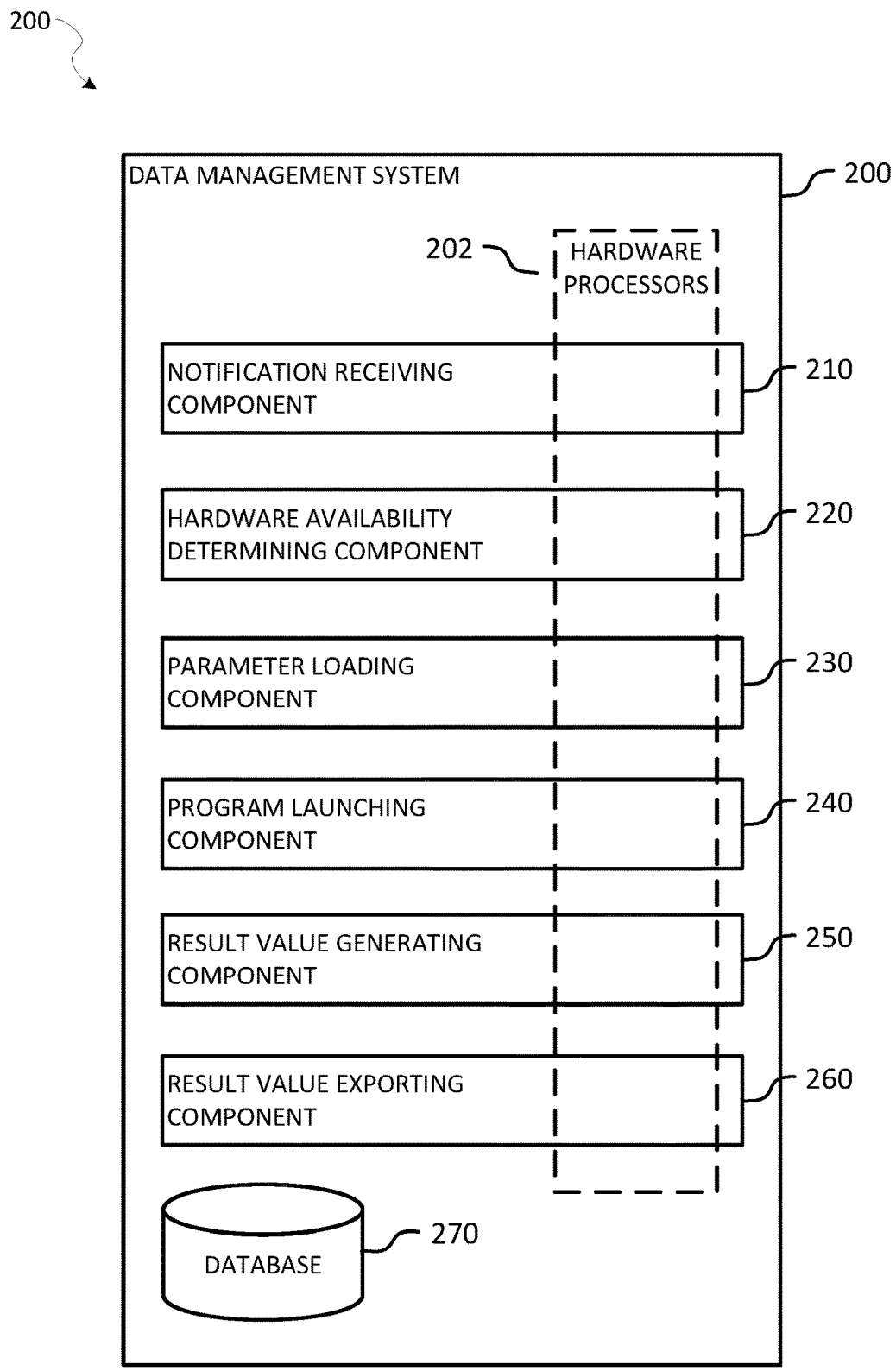
FIG. 2 is a block diagram illustrating an example data management system, according to various embodiments.

FIG. 2 is a block diagram illustrating an example data management system 200, according to various embodiments. For some embodiments, the data management system 200 represents an example of the data management system 122 described with respect to FIG. 1. As shown, the data management system 200 comprises a notification receiving component 210, a hardware availability determining component 220, a parameter loading component 230, a program launching component 240, a result value generating component 250, and a result value exporting component 260. According to various embodiments, one or more of the notification receiving component 210, the hardware availability determining component 220, the parameter loading component 230, the program launching component 240, the result value generating component 250, and the result value exporting component 260 are implemented by one or more hardware processors 202. Data generated by one or more of the notification receiving component 210, the hardware availability determining component 220, the parameter loading component 230, the program launching component 240, the result value generating component 250, and the result value exporting component 260 may be stored in a database (or datastore) 270 of the data management system 200.

The notification receiving component 210 is configured to receive (or cause a processor to receive) one or more notifications from hardware. A notification can include one or more parameters that trigger a program that processes the notification.

The hardware availability determining component 220 is configured to determine whether a received message includes an indication that the hardware associated with the notification is available to respond to one or more operations. Upon determining that the hardware is available, the hardware availability determining component 220 is configured to launch (or cause a processor to launch) one or more programs that handle the one or more notifications based on the one or more parameters.

In various embodiments, upon determining that the hardware is unavailable to respond to one or more operations, the hardware availability determining component 220 is configured to withhold (or cause the processor to withhold) the launching of the one or more programs until receiving an indication that the hardware is available to respond to the one or more operations.

The parameter loading component 230 is configured to cause the hardware to load one or more working registers associated with the processor with the one or more parameters in a single parallel operation.

The program launching component 240 is configured to launch (or cause a processor to launch) one or more programs that handle the one or more notifications based on the one or more parameters.

The result value generating component 250 is configured to generate (or cause the processor to generate) one or more result values based on the launching of the one or more programs.

The result value exporting component 260 is configured to export (or cause the processor to export) the one or more result values to the hardware for processing.

Figure 3:
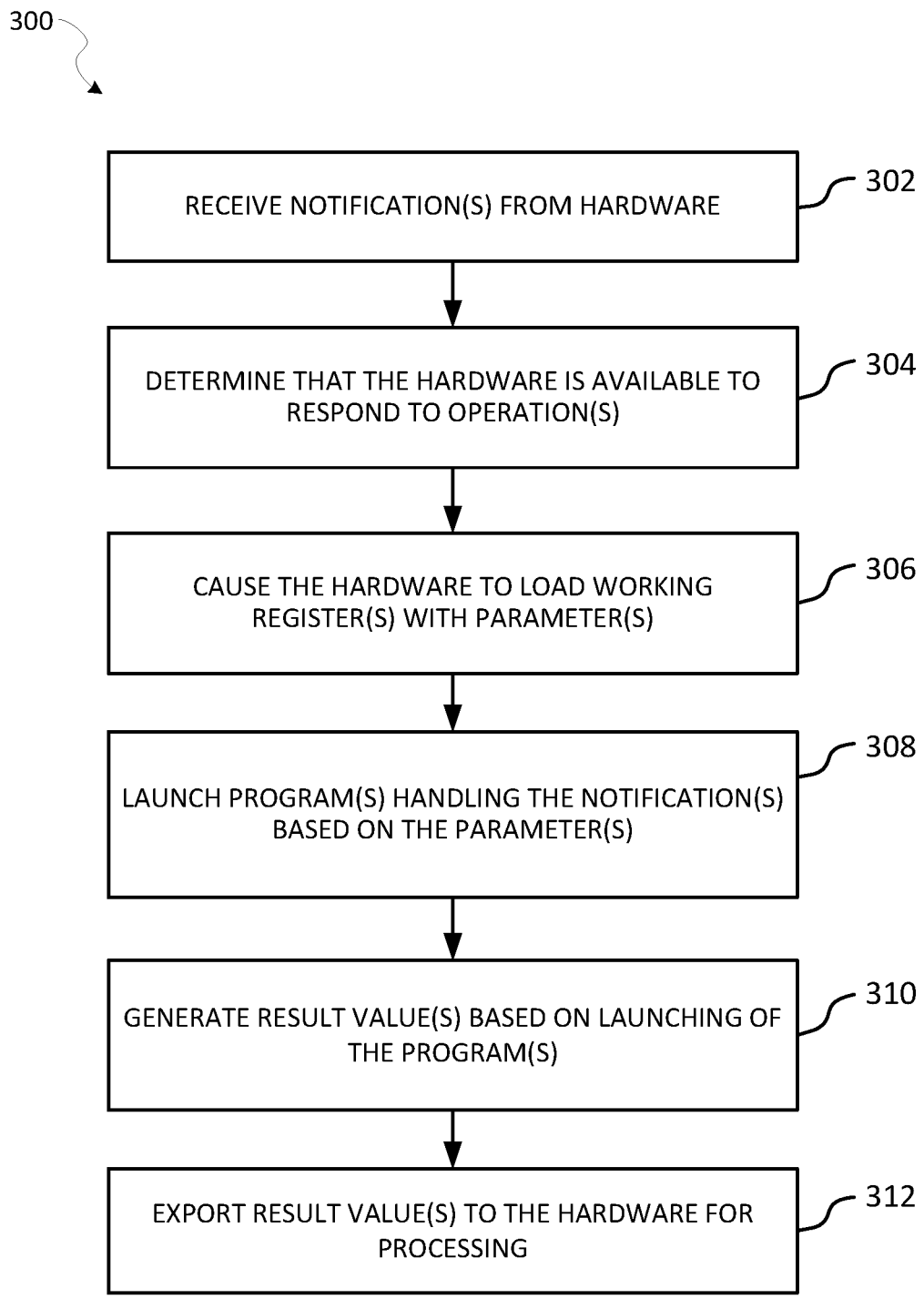
FIG. 3 is a flowchart illustrating an example method for facilitating rapid program launch, according to various embodiments.

FIG. 3 is a flowchart illustrating an example method 300 for facilitating rapid program launch, according to various embodiments. It will be understood that methods described herein can be performed by a machine in accordance with some embodiments. For example, method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor receives (or causes a processor to receive) one or more notifications from hardware. A notification can include one or more parameters that trigger a program that processes the notification.

At operation 304, a processor determines whether the hardware is available to respond to one or more operations. The availability of the hardware can be determined based on the status of the one or more staging registers associated with the hardware. In various embodiments, a staging register can include a single-entry first-in-first-out (FIFO) component and/or a multi-entry FIFO component.

At operation 306, a processor causes the hardware to load one or more working registers associated with the processor with the one or more parameters in a single parallel operation.

At operation 308, a processor launches one or more programs that handle the one or more notifications based on the one or more parameters At operation 310, a processor generates one or more result values based on the launching of the one or more programs.

At operation 312, a processor exports the one or more result values to the hardware for processing.

Though not illustrated, method 300 can include an operation where a graphical user interface for managing data can be displayed (or caused to be displayed) by the hardware processor. For instance, the operation can cause a computing device to display the graphical user interface for facilitating rapid program launch. This operation for displaying the graphical user interface can be separate from operations 302 through 312 or, alternatively, form part of one or more of operations 302 through 312.

Figure 4:
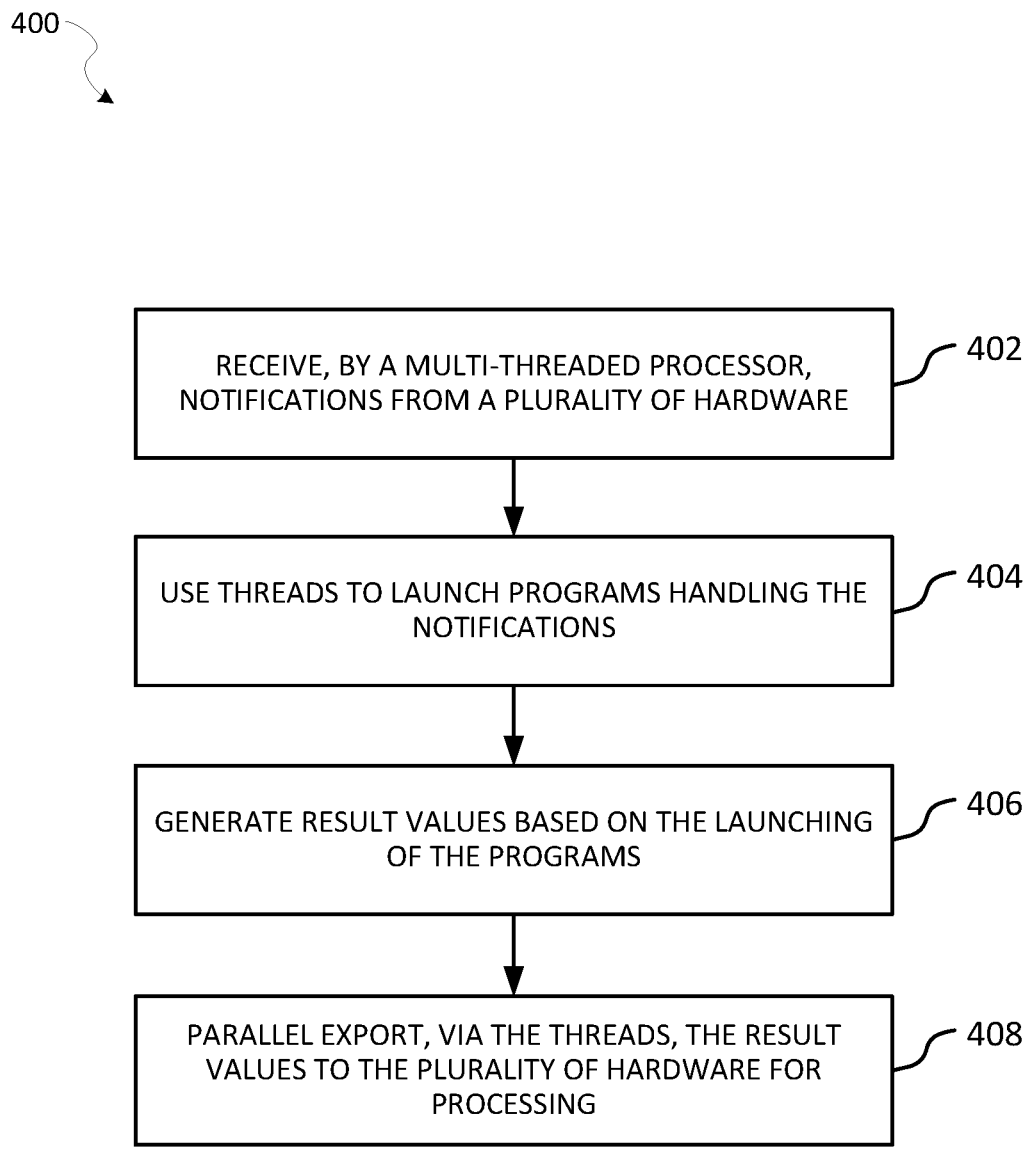
FIG. 4 is a flowchart illustrating an example method for facilitating rapid program launch, according to various embodiments.

FIG. 4 is a flowchart illustrating an example method for facilitating rapid program launch, according to various embodiments. It will be understood that methods described herein can be performed by a machine in accordance with some embodiments. For example, method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, a processor receives a plurality of notifications from a plurality of hardware.

At operation 404, a processor uses a plurality of threads to launch a plurality of programs that handle the plurality of notifications. Each thread can be considered as a separate processor core that operates independently from the rest of the threads.

At operation 406, a processor generates a plurality of result values based on the launching of the plurality of programs.

At operation 408, a processor parallel-exports the plurality of result values to the plurality of hardware for processing.

Though not illustrated, method 400 can include an operation where a graphical user interface for managing data can be displayed (or caused to be displayed) by the hardware processor. For instance, the operation can cause a computing device to display the graphical user interface for facilitating rapid program launch. This operation for displaying the graphical user interface can be separate from operations 402 through 408 or, alternatively, form part of one or more of operations 402 through 408.

Figure 5:
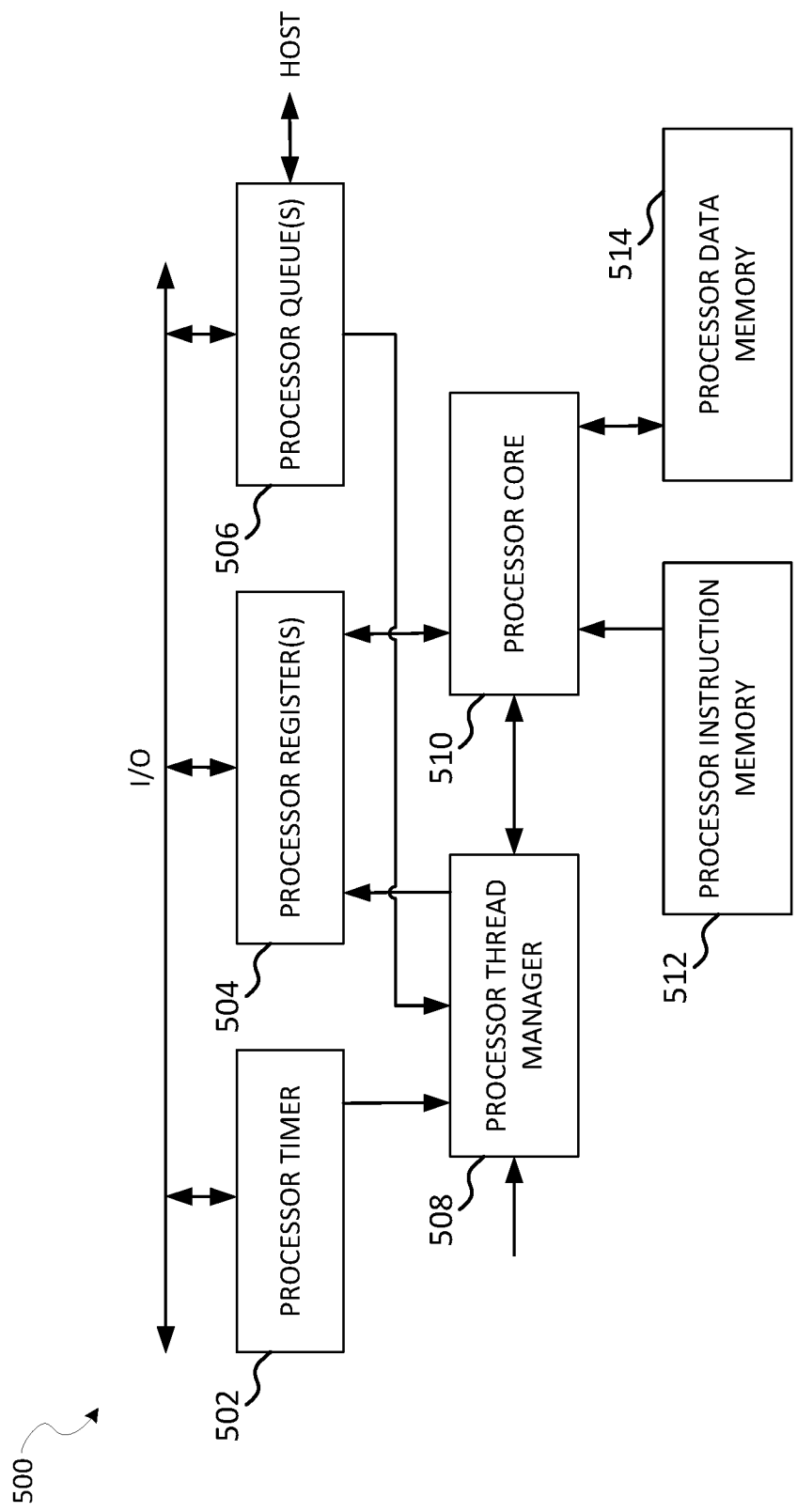
FIG. 5 is a block diagram illustrating an example multi-threaded processor, according to various embodiments.

FIG. 5 is a block diagram 500 illustrating an example multi-threaded processor, according to various embodiments. As shown, the example multi-threaded processor includes a plurality of components (or functional elements), such as processor timer 502, processor registers 504, processor queues 506, processor thread manager 508, processor core 510, processor instruction memory 512, and processor data memory 514. Block diagram 500 merely illustrates the main data paths and not the various control and address paths.

Processor queues 506 implements the various queues called for by an InfiniBand or other network endpoint, including Send queues, Receive queues, and Completion queues. These queues are used to initiate and terminate a number of types of operations.

Processor registers 504 provides a series of registers that are accessed directly by a variety of instructions, providing operands and storing results. Processor registers 504 can be used to hold the processing state and parameters for individual data packets.

Processor timer 502 provides a series of high-precision timers that, upon reaching their terminal state, can provide parameters (e.g., a counter ID value) and initiate the execution of a program by processor core 510. Processor timer 502 can manage thousands of independent timers that have a dynamic range of tens of nanoseconds to units of seconds. Processor timer 502 may be programmed to repeat periodically and may be canceled or paused.

Processor thread manager 508 can receive notifications from processor queues 506, processor timer 502, and other sources. Processor thread manager 508 can capture parameters that are automatically loaded into processor registers 504 and launch programs in processor core 510.

Processor data memory 514 can be used to store long-term state and parameters that are preserved between program launches to create or process messages and sustain connections. The content of processor data memory 514 are read and written as needed by a particular sequence of instructions executed by processor core 510.

Processor instruction memory 512 can provide executable instructions to processor core 510.

Processor core 510 can execute instructions provided by processor instruction memory 512, and use and update the temporary contents of processor registers 504. Processor core 510 can manage the behavior of processor queues 506, and read and write the long-term contents of processor data memory 514.

Figure 6:
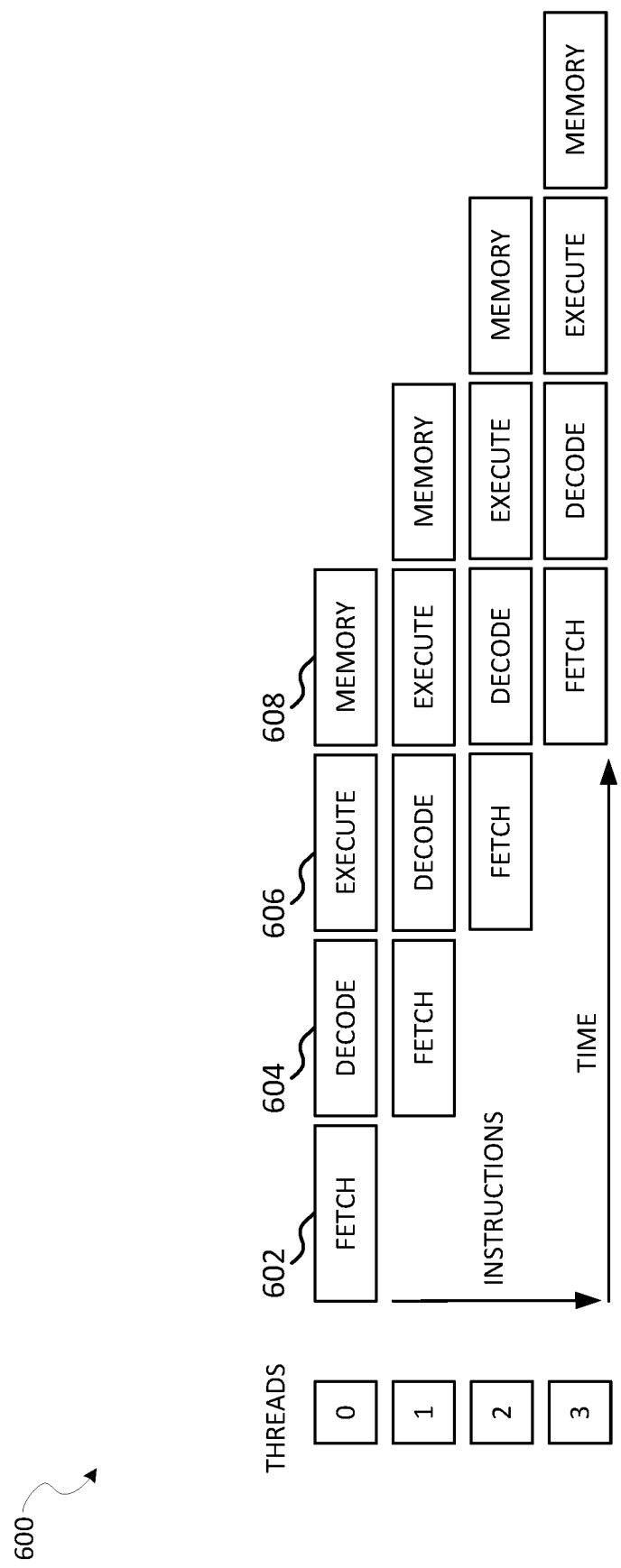
FIG. 6 is a diagram illustrating an example data flow in an example multi-threaded processor during operation, according to various embodiments.

FIG. 6 is a block diagram 600 illustrating an example data flow in an example multi-threaded processor during operation, according to various embodiments. As shown, a multi-threaded processor can include four threads 0-3. A single thread can execute a program. The length of the instruction pipeline can dictate the performance of an individual running program since a program can only advance from one instruction to the next with each complete cycle of the pipeline. To maximize performance and keep every stage (e.g., fetch 602, decode 604, execute 606, memory 608) of the processing pipeline filled with productive work, multiple threads can be processed simultaneously (or in parallel). An instruction from each thread can enter the top of the pipeline on subsequent clock cycles in a round robin fashion, as illustrated in FIG. 6.

Pending work (e.g., received packets, etc.) can wait for a thread to become available. When pending work claims a thread, it becomes eligible to load the parameters related to the work into the register set within processor registers 504 that correspond to the claimed thread. Once the parameters have been loaded (together with a value of the thread's program counter), the thread can be executed by the processing pipeline.

Data (e.g., data packets) can be processed in order. Specifically, all packets related to a connection can be processed in order, while the relative order of packets associated with other connections is immaterial. Processor core 510 can use queue identifiers associated with connections (and reflected in packet headers or metadata) as a proxy for a connection. A queue can manage multiple connections, whereas a single connection may not use multiple queues. To keep thread management relatively simple, each queue may be configured to be associated with a particular thread. Therefore, each queue can choose the same thread. Usage statistics can be available to help rebalance the thread assignments if some threads spend significant time idle or if certain queues do not advance as quickly as expected.

Figure 7:
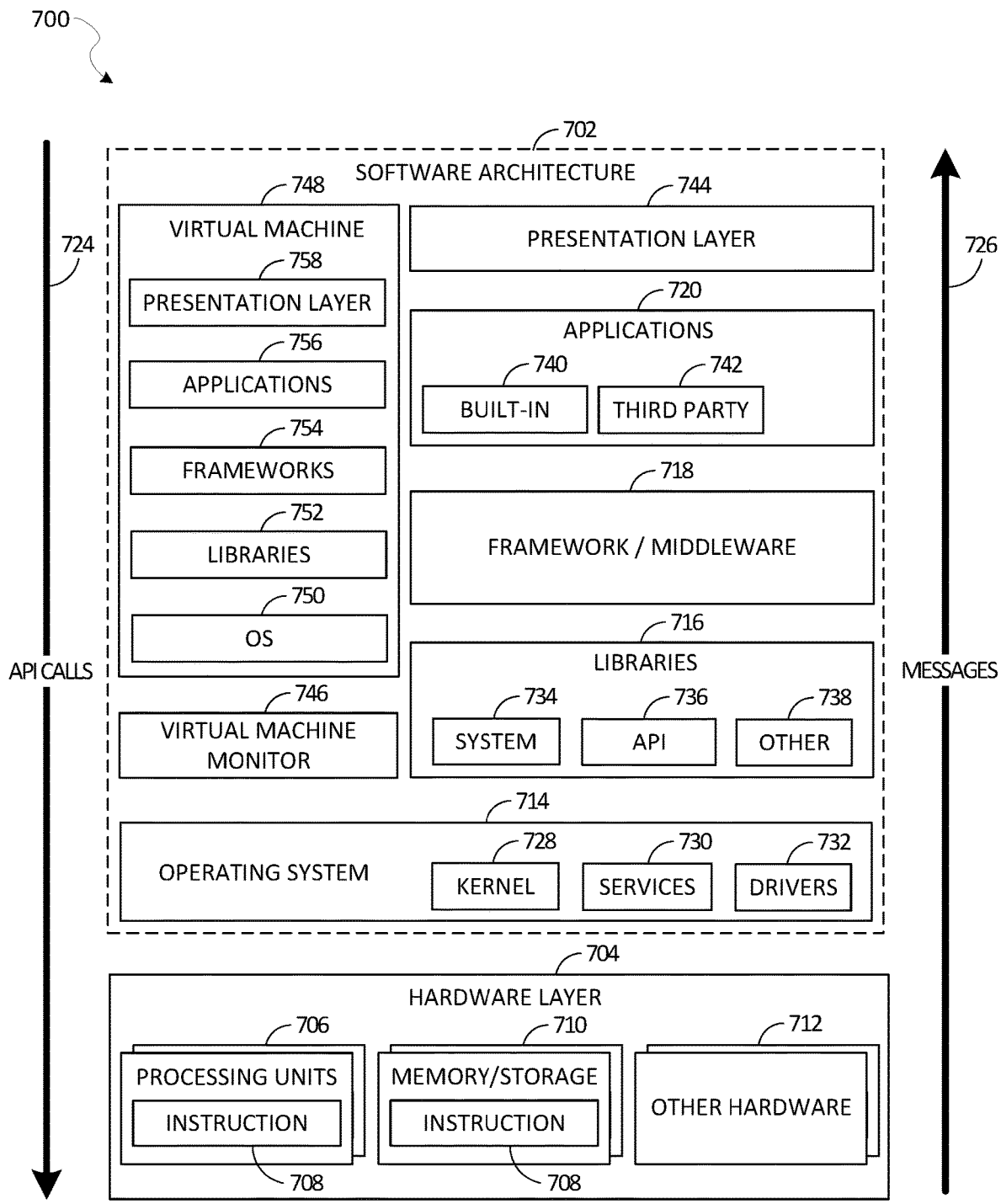
FIG. 7 is a block diagram illustrating a representative software architecture, which can be used in conjunction with various hardware architectures herein described, according to various embodiments.

FIG. 7 is a block diagram illustrating an example of a software architecture 702 that can be installed on a machine, according to some embodiments. FIG. 7 is merely a non-limiting embodiment of a software architecture, and it will be appreciated that many other architectures can be implemented to facilitate the functionality described herein. The software architecture 702 can be executing on hardware such as a machine 800 of FIG. 8 that includes, among other things, processors 810, memory 830, and input/output (I/O) components 850. A representative hardware layer 704 is illustrated and can represent, for embodiment, the machine 800 of FIG. 8. The representative hardware layer 704 comprises one or more processing units 706 having associated executable instructions 708. The executable instructions 708 represent the executable instructions of the software architecture 702. The hardware layer 704 also includes memory or storage modules 710, which also have the executable instructions 708. The hardware layer 704 can also comprise other hardware 712, which represents any other hardware of the hardware layer 704, such as the other hardware illustrated as part of the machine 800.

In the embodiment architecture of FIG. 7, the software architecture 702 can be conceptualized as a stack of layers, where each layer provides particular functionality. For embodiment, the software architecture 702 can include layers such as an operating system 714, libraries 716, frameworks/middleware 718, applications 720, and a presentation layer 744. Operationally, the applications 720 or other components within the layers can invoke API calls 724 through the software stack and receive a response, returned values, and so forth (illustrated as messages 726) in response to the API calls 724. The layers illustrated are representative in nature, and not all software architectures have all layers. For embodiment, some mobile or special-purpose operating systems cannot provide a frameworks/middleware 718 layer, while others can provide such a layer. Other software architectures can include additional or different layers.

The operating system 714 can manage hardware resources and provide common services. The operating system 714 can include, for embodiment, a kernel 728, services 730, and drivers 732. The kernel 728 can act as an abstraction layer between the hardware and the other software layers. For embodiment, the kernel 728 can be responsible for memory management, processor management (e.g., scheduling), component management, networking, security settings, and so on. The services 730 can provide other common services for the other software layers. The drivers 732 can be responsible for controlling or interfacing with the underlying hardware. For instance, the drivers 732 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 can provide a common infrastructure that can be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, or drivers 732). The libraries 716 can include system libraries 734 (e.g., C standard library) that can provide functions such as memory allocation functions, string manipulation functions, mathematic functions, and the like. In addition, the libraries 716 can include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that can be used to render 2D and 3D graphic content on a display), database libraries (e.g., SQLite that can provide various relational database functions), web libraries (e.g., WebKit that can provide web browsing functionality), and the like. The libraries 716 can also include a wide variety of other libraries 738 to provide many other APIs to the applications 720 and other software components/modules.

The frameworks 718 (also sometimes referred to as middleware) can provide a higher-level common infrastructure that can be utilized by the applications 720 or other software components/modules. For embodiment, the frameworks 718 can provide various graphical user interface functions, high-level resource management, high-level location services, and so forth. The frameworks 718 can provide a broad spectrum of other APIs that can be utilized by the applications 720 and/or other software components/modules, some of which can be specific to a particular operating system or platform.

The applications 720 include built-in applications 740 and/or third-party applications 742. Embodiments of representative built-in applications 740 can include, but are not limited to, a home application, a contacts application, a browser application, a book reader application, a location application, a media application, a messaging application, or a game application.

The third-party applications 742 can include any of the built-in applications 740, as well as a broad assortment of other applications. In a specific embodiment, the third-party applications 742 (e.g., an application developed using the Android™ or iOS™ software development kit (SDK) by an entity other than the vendor of the particular platform) can be mobile software running on a mobile operating system such as iOS™, Android™, or other mobile operating systems. In this embodiment, the third-party applications 742 can invoke the API calls 724 provided by the mobile operating system such as the operating system 714 to facilitate functionality described herein.

The applications 720 can utilize built-in operating system functions (e.g., kernel 728, services 730, or drivers 732), libraries (e.g., system libraries 734, API libraries 736, and other libraries 738), or frameworks/middleware 718 to create user interfaces to interact with users of the system. Alternatively, or additionally, in some systems, interactions with a user can occur through a presentation layer, such as the presentation layer 744. In these systems, the application/module "logic" can be separated from the aspects of the application/module that interact with the user.

Some software architectures utilize virtual machines. In the embodiment of FIG. 7, this is illustrated by a virtual machine 748. The virtual machine 748 creates a software environment where applications/modules can execute as if they were executing on a hardware machine (e.g., the machine 800 of FIG. 8). The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, or a presentation layer 758. These layers of software architecture executing within the virtual machine 748 can be the same as corresponding layers previously described or can be different.

Figure 8:
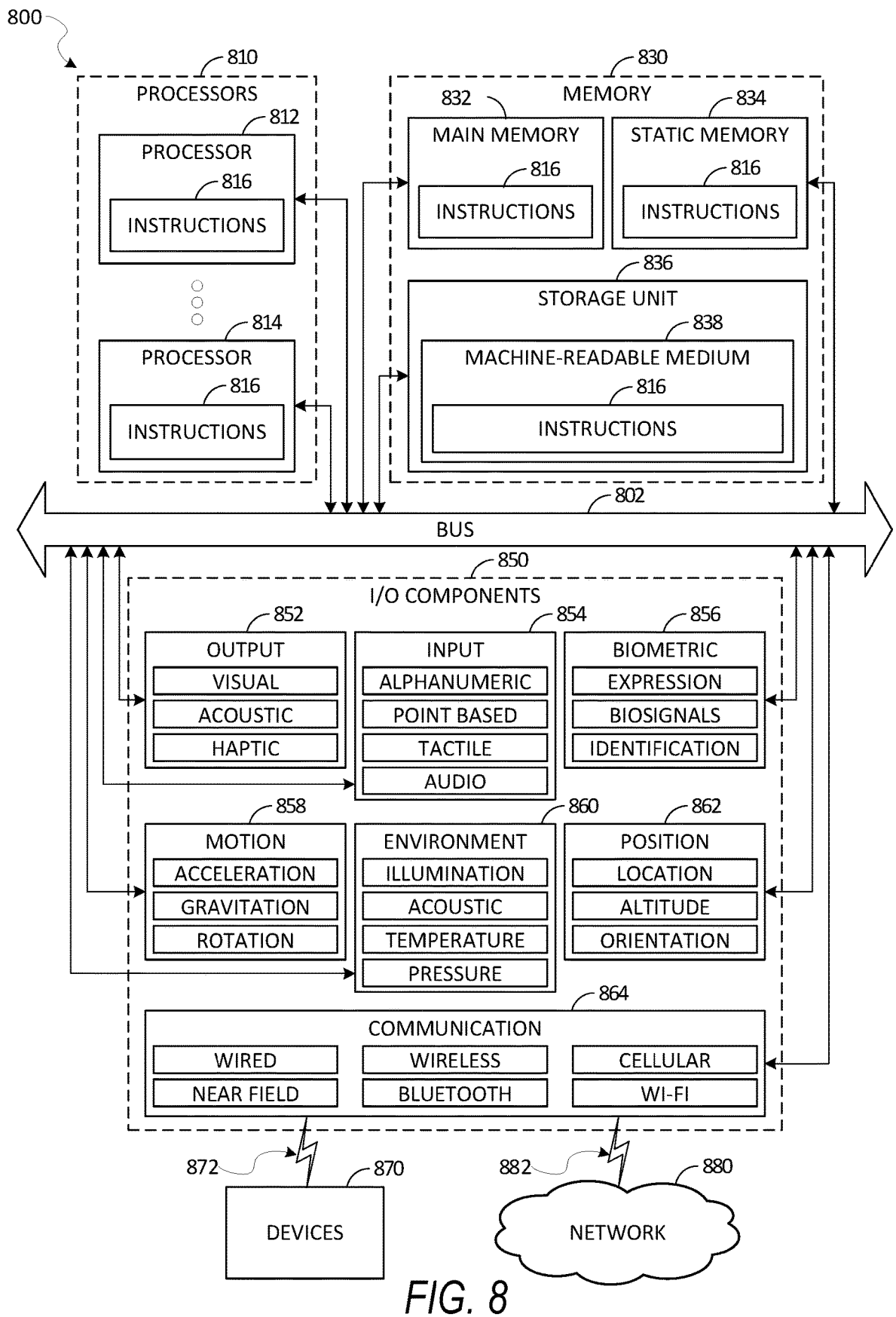
FIG. 8 is a block diagram illustrating components of a machine able to read instructions from a machine storage medium and perform any one or more of the methodologies discussed herein according to various embodiments.

FIG. 8 illustrates a diagrammatic representation of a machine 800 in the form of a computer system within which a set of instructions can be executed for causing the machine 800 to perform any one or more of the methodologies discussed herein, according to an embodiment. Specifically, FIG. 8 shows a diagrammatic representation of the machine 800 in the embodiment form of a computer system, within which instructions 816 (e.g., software, a program, an application, an applet, an app, or other executable code) for causing the machine 800 to perform any one or more of the methodologies discussed herein can be executed. For embodiment, the instructions 816 can cause the machine 800 to execute the method 300 described above with respect to FIG. 3, and the method 400 described above with respect to FIG. 4. The instructions 816 transform the general, non-programmed machine 800 into a particular machine 800 programmed to carry out the described and illustrated functions in the manner described. In some embodiments, the machine 800 operates as a standalone device or can be coupled (e.g., networked) to other machines. In a networked deployment, the machine 800 can operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 can include processors 810, memory 830, and I/O components 850, which can be configured to communicate with each other such as via a bus 802. In an embodiment, the processors 810 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) can include, for embodiment, a processor 812 and a processor 814 that can execute the instructions 816. The term "processor" is intended to include multi-core processors that can comprise two or more independent processors (sometimes referred to as "cores") that can execute instructions contemporaneously. Although FIG. 8 shows multiple processors 810, the machine 800 can include a single processor with a single core, a single processor with multiple cores (e.g., a multi-core processor), multiple processors with a single core, multiple processors with multiples cores, or any combination thereof.

The memory 830 can include a main memory 832, a static memory 834, and a storage unit 836 including machine-readable medium 838, each accessible to the processors 810 such as via the bus 802. The main memory 832, the static memory 834, and the storage unit 836 store the instructions 816 embodying any one or more of the methodologies or functions described herein. The instructions 816 can also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 can include a wide variety of components to receive input, provide output, produce output, transmit information, exchange information, capture measurements, and so on. The specific I/O components 850 that are included in a particular machine will depend on the type of machine. For embodiment, portable machines such as mobile phones will likely include a touch input device or other such input mechanisms, while a headless server machine will likely not include such a touch input device. It will be appreciated that the I/O components 850 can include many other components that are not shown in FIG. 8. The I/O components 850 are grouped according to functionality merely for simplifying the following discussion, and the grouping is in no way limiting. In various embodiments, the I/O components 850 can include output components 852 and input components 854. The output components 852 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 850 can include biometric components 856, motion components 858, environmental components 860, or position components 862, among a wide array of other components. The motion components 858 can include acceleration sensor components (e.g., accelerometer), gravitation sensor components, rotation sensor components (e.g., gyroscope), and so forth. The environmental components 860 can include, for embodiment, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 862 can include location sensor components (e.g., a Global Positioning System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 850 can include communication components 864 operable to couple the machine 800 to a network 880 or devices 870 via a coupling 882 and a coupling 872, respectively. For embodiment, the communication components 864 can include a network interface component or another suitable device to interface with the network 880. In further embodiments, the communication components 864 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 can be another machine or any of a wide variety of peripheral devices (e.g., a peripheral device coupled via a USB).

Moreover, the communication components 864 can detect identifiers or include components operable to detect identifiers. For embodiment, the communication components 864 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 864, such as location via Internet Protocol (IP) geolocation, location via Wi-Fi® signal triangulation, location via detecting an NFC beacon signal that can indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For embodiment, a hardware module can include dedicated circuitry or logic that is permanently configured to perform certain operations. For embodiment, a hardware module can be a special-purpose processor, such as a field-programmable gate array (FPGA) or an ASIC. A hardware module can also include programmable logic or circuitry that is temporarily configured by software to perform certain operations. For embodiment, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. In various embodiments, where a hardware module includes a general-purpose processor configured by software to become a special-purpose processor, the general-purpose processor can be configured as respectively different special-purpose processors (e.g., comprising different hardware modules) at different times. Software can accordingly configure a particular processor or processors, for embodiment, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules can be achieved, for embodiment, through the storage and retrieval of information in memory structures to which the multiple hardware modules have access. For embodiment, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of embodiment methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For embodiment, at least some of the operations of a method can be performed by one or more processors or processor-implemented modules. Moreover, the one or more processors can also operate to support performance of the relevant operations in a "cloud computing" environment or as a "software as a service" (SaaS). For embodiment, at least some of the operations can be performed by a group of computers (as embodiments of machines 800 including processors 810), with these operations being accessible via a network (e.g., the Internet) and via one or more appropriate interfaces (e.g., an API). In certain embodiments, for embodiment, a client device can relay or operate in communication with cloud computing systems and can access circuit design information in a cloud environment.

The performance of certain of the operations can be distributed among the processors, not only residing within a single machine 800, but deployed across a number of machines 800. In some embodiment embodiments, the processors 810 or processor-implemented modules are located in a single geographic location (e.g., within a home environment, an office environment, or a server farm). In other embodiments, the processors or processor-implemented modules are distributed across a number of geographic locations.

Executable Instructions and Machine Storage Medium

The various memories (i.e., 830, 832, 834, and/or the memory of the processor(s) 810) and/or the storage unit 836 can store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and can be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors. Specific embodiments of machine-storage media, computer-storage media and/or device-storage media include non-volatile memory, including by way of embodiment semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 880 can be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For embodiment, the network 880 or a portion of the network 880 can include a wireless or cellular network, and the coupling 882 can be a Code Division Multiple Access (CDMA) connection, a Global System for Mobile communications (GSM) connection, or another type of cellular or wireless coupling. In this embodiment, the coupling 882 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions can be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions can be transmitted or received using a transmission medium via the coupling (e.g., a peer-to-peer coupling) to the devices 870. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances can implement resources, components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in embodiment configurations can be implemented as a combined structure or component. Similarly, structures and functionality presented as a single component can be implemented as separate components.

As used herein, the term "or" can be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases can be absent. Additionally, boundaries between various resources, operations, modules, engines, and data stores are somewhat arbitrary, and particular operations are illustrated in a context of specific illustrative configurations. Other allocations of functionality are envisioned and can fall within a scope of various embodiments. The specification and drawings are, accordingly, to be regarded in an illustrative rather than a restrictive sense.

It will be understood that changes and modifications can be made to the disclosed embodiments without departing from the scope of the present disclosure. These and other changes or modifications are intended to be included within the scope of the present disclosure.

What is claimed is:

1. A method comprising:
 receiving, by a hardware processor, a notification from a hardware unit, the notification comprising one or more parameters that trigger a program that processes the notification;
 causing the hardware unit to load one or more working registers, associated with the hardware processor, with the one or more parameters in a single parallel operation;
 launching, by the hardware processor, the program that handles the notification based on the one or more parameters;
 generating, by the hardware processor, one or more result values based on the launching of the program; and
 exporting, by the hardware processor, the one or more result values to the hardware unit for processing.

2. The method of claim 1, further comprising:
 receiving, by the hardware processor, a message from the hardware unit;
 determining that message comprises an indication that the hardware unit is available to respond to one or more operations; and
 upon determining that the hardware unit is available, launching, by the hardware processor, the program that handles the notification based on the one or more parameters.

3. The method of claim 2, wherein the one or more operations comprise one or more Input/Output (I/O) write operations.

4. The method of claim 1, further comprising:
 determining that the hardware unit is unavailable to respond to one or more operations; and
 withholding a launching of the program that handles the notification until receiving an indication that the hardware unit is available to respond to the one or more operations.

5. The method of claim 1, wherein the hardware unit is associated with a staging register, further comprising:
 identifying a status of the staging register; and
 determining that the hardware unit is available based on the status of the staging register.

6. The method of claim 5, wherein the staging register comprises a single-entry first-in-first-out (FIFO) component.

7. The method of claim 5, further comprising:
 storing, by the hardware processor, the one or more result values in the staging register associated with the hardware unit.

8. The method of claim 1, further comprising:
 performing, by the hardware processor, one or more I/O write operations to the hardware unit based on the one or more result values.

9. The method of claim 8, further comprising:
 identifying one or more I/O write parameters associated with the one or more result values;
 storing the one or more I/O write parameters in a FIFO component associated with the hardware unit; and
 causing the hardware unit to process the one or more result values based on the one or more I/O write parameters.

10. The method of claim 8, wherein one or more I/O write operations cause the hardware unit to launch one or more hardware activities.

11. The method of claim 1, wherein the hardware processor is a multi-threaded hardware processor, the notification being a first notification, the hardware unit being a first hardware unit, the program being a first program, the one or more result values being one or more first result values, further comprising:
 receiving, by the multi-threaded hardware processor, a second notification from a second hardware unit;
 using a second thread to launch, by the multi-threaded hardware processor, a second program that handles the second notification;
 generating, by the multi-threaded hardware processor, one or more second result values based on a launching of the second program; and
 parallel exporting, by the multi-threaded hardware processor, the one or more first result values to the first hardware unit and the one or more second result values to the second hardware unit for processing.

12. The method of claim 11, wherein each thread of the multi-threaded hardware processor corresponds to a hardware processor core that operates independently from other threads.

13. A system comprising:
 a memory storing instructions; and
 one or more hardware processors communicatively coupled to the memory and configured by the instructions to perform operations comprising:
  receiving, by a hardware processor, a notification from a hardware unit, the notification comprising one or more parameters that trigger a program that processes the notification;
  causing the hardware unit to load one or more working registers associated with the hardware processor with the one or more parameters in a single parallel operation;
  launching, by the hardware processor, the program that handles the notification based on the one or more parameters;
  generating, by the hardware processor, one or more result values based on the launching of the program; and
  exporting, by the hardware processor, the one or more result values to the hardware unit for processing.

14. The system of claim 13, wherein the operations further comprise:
 receiving, by the hardware processor, a message from the hardware unit;
 determining that message comprises an indication that the hardware unit is available to respond to one or more operations; and
 upon determining that the hardware unit is available, launching, by the hardware processor, the program that handles the notification based on the one or more parameters.

15. The system of claim 13, wherein the one or more operations comprise one or more Input/Output (I/O) write operations.

16. The system of claim 13, wherein the operations further comprise:
 determining that the hardware unit is unavailable to respond to one or more operations; and
 withholding a launching of the program that handles the notification until receiving an indication that the hardware unit is available to respond to the one or more operations.

17. The system of claim 13, wherein the hardware unit is associated with a staging register, and wherein the operations further comprise:
 identifying a status of the staging register; and
 determining that the hardware unit is available based on the status of the staging register.

18. The system of claim 13, wherein the operations further comprise:
 performing, by the hardware processor, one or more I/O write operations to the hardware unit based on the one or more result values.

19. The system of claim 18, wherein the operations further comprise:
 identifying one or more I/O write parameters associated with the one or more result values;
 storing the one or more I/O write parameters in a FIFO component associated with the hardware unit; and
 causing the hardware unit to process the one or more result values based on the one or more I/O write parameters.

20. A non-transitory computer-readable medium comprising instructions that, when executed by a hardware processor of a device, cause the device to perform operations comprising:
 receiving a notification from a hardware unit, the notification comprising one or more parameters that trigger a program that processes the notification;
 causing the hardware unit to load one or more working registers associated with the hardware processor with the one or more parameters in a single parallel operation;
 launching the program that handles the notification based on the one or more parameters;
 generating one or more result values based on the launching of the program; and
 exporting the one or more result values to the hardware unit for processing.

* * * * *